Patented Apr. 13, 1943

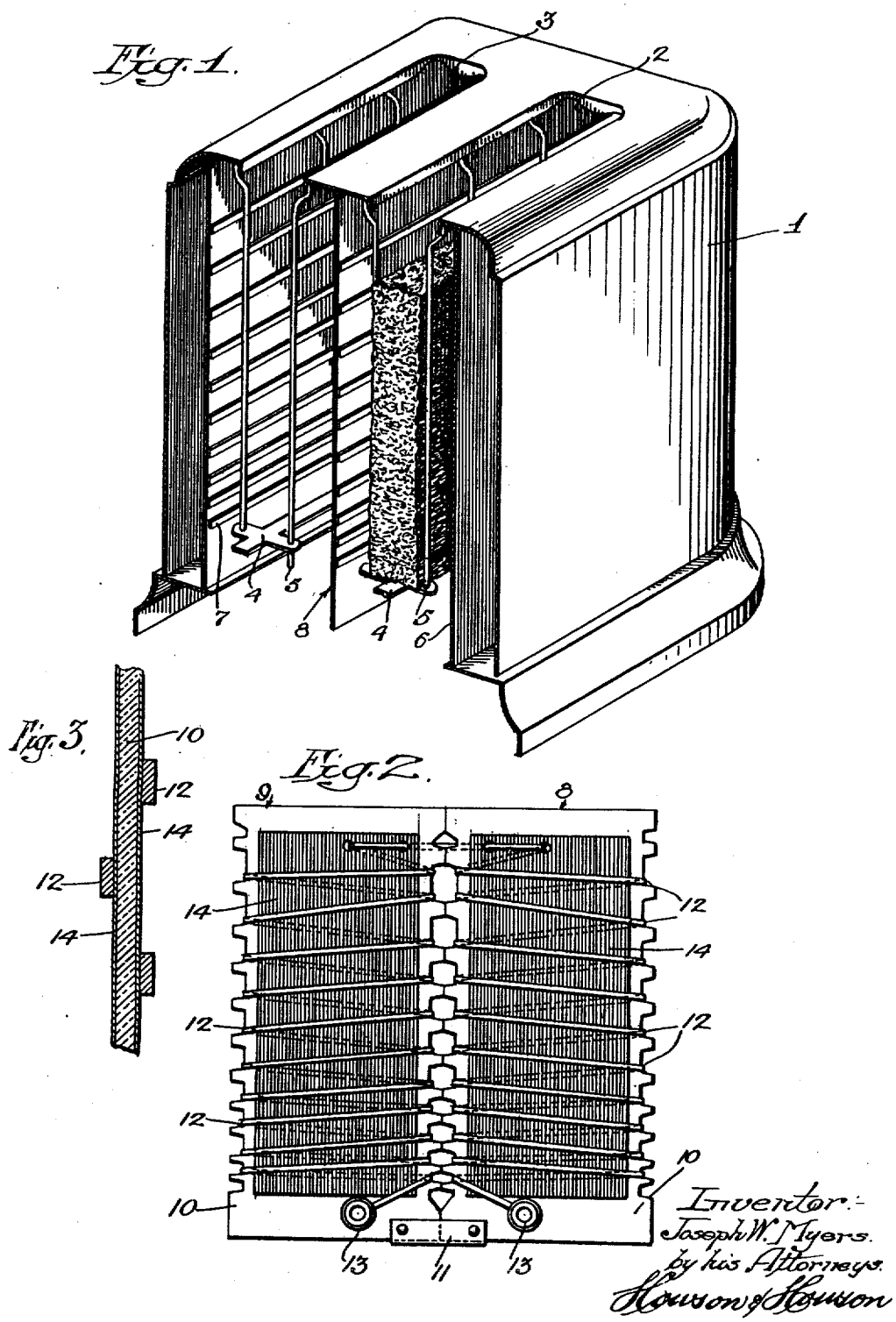

2,316,699

UNITED STATES PATENT OFFICE 2,316,699

TOASTER-COATED UNIT

Joseph W. Myers, Philadelphia, Pa., assignor to Proctor & Schwartz, Inc., Philadelphia, Pa., a corporation of Pennsylvania Application May 24, 1940, Serial No. 337,053

3 Claims. (Cl. 219—19)

This invention relates to new and useful improvements in electrical cooking appliances and more particularly to bread toasters of the two-slice type having spaced parallel recesses or wells adapted to receive the bread slices.

While in the better grade of toasters of the type here involved, it is the practice, generally, to provide each of the two bread wells with a separate set of electrical heating elements arranged along respectively opposite sides of each such well, the economical and manufacturing advantages to be gained by the use of a single or common heating unit between the two bread wells of a toaster of the present type are well recognized, and some manufacturers of toasters have resorted to the use of a common intermediate heating unit in order to reduce the cost of manufacturing such toasters and, consequently, the sales price thereof to the public.

However, in these toasters which employ a common intermediate heating unit, an unbalanced operating condition occurs and manifests itself particularly in instances when a slice of bread is being toasted in only one of the two wells. This unbalanced operation results in an uneven surface cooking or toasting of the opposite sides of the slice of bread and the inner surface thereof will very often be burnt before the outer surface is toasted to the desired degree.

In toasters of the type here involved which employ a separate set of heating elements for each of the bread wells, such unbalanced operation, if present to any appreciable extent, may be readily eliminated by providing adequate heat insulation between the two inner heating elements. It is obviously impossible, however, to thus eliminate the unbalanced condition in toasters employing a common intermediate heating element and prior toasters of this type have been unsatisfactory because of this condition. It has been generally believed that the unbalanced operation occurring in such toasters is due to transfer of heat from the idle heating element through the unused well, causing the degree of heat adjacent the inner surface of a single slice of bread to be materially greater than that generated adjacent the outer surface thereof. Accordingly, and in view of the impossibility of employing heat insulation, it has seemingly been impossible to obviate this condition.

However, I have discovered that this unbalanced operation in toasters employing a single intermediate heating element is caused particularly by the intermediate heating unit acting as an absorber and re-radiator of heat. I have determined that this unit re-radiates toward the bread slice the excessive heat absorbed from the idle heating element. The combined effect of such heat absorption and re-radiation by the intermediate unit is to subject the inner surface of the bread slice to excessive temperature, thus causing opposite sides thereof to be unevenly toasted.

With the foregoing in mind, the principal object of the present invention is to provide an electrical heating unit which can be employed satisfactorily between the bread wells of a two-slice toaster as a common heating means therefor and which is constructed and arranged at all times to provide balanced operation and uniform toasting of the opposite sides of a slice of bread.

Another object of the invention is to provide an electrical heating unit of the character set forth embodying certain novel features of construction and arrangement whereby the radiating action of such unit is so controlled that the heat given off by the opposite sides of said unit is substantially balanced in relation to the heat generated by the outer heating units independently of the presence or absence of bread slices.

These and other objects of the invention and the various features and details of the construction, arrangement and operation thereof are hereinafter fully set forth and described and shown in the accompanying drawing, in which:

Figure 1 is a sectional perspective view of a two-slice toaster having interposed between the adjacent wells thereof an electrical heating unit made according to the present invention.

Figure 2 is a view in elevation of an electrical heating unit made according to this invention; and Figure 3 is an enlarged fragmentary view in section vertically through a portion of the heating unit illustrated in Figure 2.

A physical embodiment of a toaster of the type here involved employing an electrical heating unit according to the present invention is shown in Figure 1 of the drawing, and referring to this figure, there is illustrated a toaster of the two-slice type comprising a body 1 having recesses or wells 2 and 3 adapted to receive the bread slices, as well understood.

In this particular type of toaster the bread slices are supported by carriages 4 which move vertically within the wells upon guides 5. This general construction of the particular toaster illustrated and the means and mechanism (not shown) for lowering and raising the carriages 4 are conventional and form no part of the invention. It is, therefore, unnecessary to discuss such structure in further detail.

Within the bread wells 2 and 3 there are provided the usual electrical heating elements 6 and 7 disposed adjacent the side walls of the body 1 of the toaster and arranged to surface cook or toast the outer surfaces of bread slices inserted in the said wells. Intermediate the wells 2 and 3 there is provided a single electrical heating unit 8 which is adapted to surface cook or toast the adjacent inner surface of bread slices in both of said wells, and it is to this intermediate heating unit 8 that the present invention is particularly directed.

Referring now to Figure 2 of the drawing, the electrical heating unit 8 includes the usual supporting or body structure 9 which, in the form illustrated, consists of two identical sheet mica sections 10 suitably secured together by a clamp 11 in contiguous laterally adjacent relation, and on these respective sections 10 of said body structure there are wound portions of a continuous length of flat resistance wire 12, the opposite ends of which are connected to electrical connectors 13.

Electrical heating units of generally similar construction have been used heretofore in toasters, but when employed as a common heating means intermediate the adjacent bread wells of a two-slice toaster they have proved highly objectionable due to the unbalanced operating condition and uneven toasting which occurs particularly when only one bread well of the device is used.

Now as hereinbefore stated, I have discovered that this unbalanced operation is caused by undesired absorption and re-radiation of heat by the intermediate heating unit, and, therefore, the particular feature of the present invention resides in the novel manner and means whereby such undesired heat absorption and re-radiation is effectively prevented so as to produce a balanced heat condition in the two bread wellls of the toaster irrespective of whether one or both of the wells is being used.

According to the present invention, the undesired absorption and re-radiation of heat by the said heating unit is effectively prevented by so constructing the unit that its heating effect is due substantially entirely to the heat generated in its resistance wire by the passage of current therethrough. This result may be attained conveniently and economically by coating the surfaces of the body structure 9 of said unit over which lie the respective portions of the resistance wire 12 with a suitable non-radiating material such as best shown in Figures 2 and 3 of the drawing. The coating must be capable of withstanding high temperatures and especially must not be such as would tend to short-circuit the adjacent spans of the resistance wire 12 which overlies such coating.

These characteristics and properties desired for the coating 14 are each present in aluminum paint and its use as such a coating is, therefore, preferred. Furthermore, in addition to providing excellent protection against heat re-radiation therefrom, I find that aluminum paint provides a coating having a surface which not only has these properties but which tends also to reflect back any heat radiating against such surface, and the effectiveness of the coating is thereby materially increased.

Too, aluminum paint is fully capable of withstanding high degrees of temperature and while metallic aluminum is generally acknowledged to be a conductor of electricity, the paint vehicle carrying the aluminum is such as to effectively prevent the coating from causing a short-circuit between adjacent spans of the overlying resistance wire 12. The paint vehicle imparts to the coating a high electrical resistance, or in other words, causes the paint to be substantially non-conducting. It is important, however, that some of the vehicle residue remains intact and it does not all burn out under the influence of high temperatures. Preferably, the coating 14 is not extended to the edges of the unit but terminates a slight distance from each edge, as shown in Figure 2. This further minimizes the possibility of current leakage through the coating, since the coating does not come into contact with the resistance wire along the vertical edge portions where the support 9 is firmly engaged by the wire.

The aluminum paint coating 14, of course, is applied to the sheet mica body 9 of the heating unit before the resistance wire 12 is wound thereon and may be applied in any suitable manner, for example, by spraying or by printing it from rubber plates.

It is essential that both sides of the unit be coated as above described in order to prevent the unbalanced operation of the toaster. As explained above, the unit tends to act as an absorber and re-radiator of heat and this undesired action can only be prevented effectively by coating both sides. This renders the unit substantially incapable of radiating heat other than that generated in its heating element.

From the foregoing it will be seen that the present invention provides an improved toaster employing a common heating unit between the bread wells novelly constructed to provide at all times a balanced heat condition within each bread well of the toaster, insuring uniform surface cooking or toasting of both sides of the bread slices whether both or only one of said bread wells is used.

While a particular embodiment of the invention has been herein illustrated and described, it is not intended that the invention be limited to such disclosure but that changes and modifications may be incorporated and made therein within the scope of the annexed claims.

I claim:

1. In a bread toaster, a pair of adjacent bread wells adapted to receive bread slices to be toasted, a pair of outer electrical heating units disposed respectively at the outer sides of said wells for toasting the outer surfaces of said bread slices, and an intermediate electrical heating unit between said wells for toasting the inner surfaces of said bread slices, said intermediate unit comprising an insulating supporting sheet, a coating of aluminum paint on each of the opposite faces of said sheet, and resistance wire wound about said sheet and disposed adjacent the coated faces thereof, said coating serving to thermally isolate said wells from one another without deleteriously affecting the insulating character of the surfaces of said sheet.

2. In a bread toaster, a pair of adjacent bread wells adapted to receive bread slices to be toasted, a pair of outer electrical heating units disposed respectively at the outer sides of said wells for toasting the outer surfaces of said bread slices, and an intermediate electrical heating unit between said wells for toasting the inner surfaces of said bread slices, said intermediate unit comprising an insulating supporting sheet, a coating of aluminum paint on each of the opposite faces of said sheet, said coating terminating a slight distance from the edges of said sheet where the resistance wire firmly engages the supporting sheet, and resistance wire wound about said sheet and disposed adjacent the coated faces thereof, said coating serving to thermally isolate said wells from one another without deleteriously affecting the insulating character of the surfaces of said sheet.

3. In a bread toaster, a bread well adapted to receive a bread slice to be toasted, an electrical heating unit disposed at one side of said well for toasting one surface of the bread slice, and an electrical heating unit disposed at the opposite side of said well for toasting the other surface of the bread slice, said last-named unit comprising an insulating supporting sheet, a coating of aluminum paint on the face of said sheet adjacent the inserted bread slice, and resistance wire supported on said sheet adjacent the coated face thereof, said coating serving to thermally isolate said well from the opposite side of said sheet without deleteriously affecting the insulating character of the surface of said sheet.

JOSEPH W. MYERS.